Jan. 18, 1927.

W. BROWN 1,614,543

FUEL VAPORIZER

Filed July 25, 1923    2 Sheets-Sheet 1

Inventor
William Brown

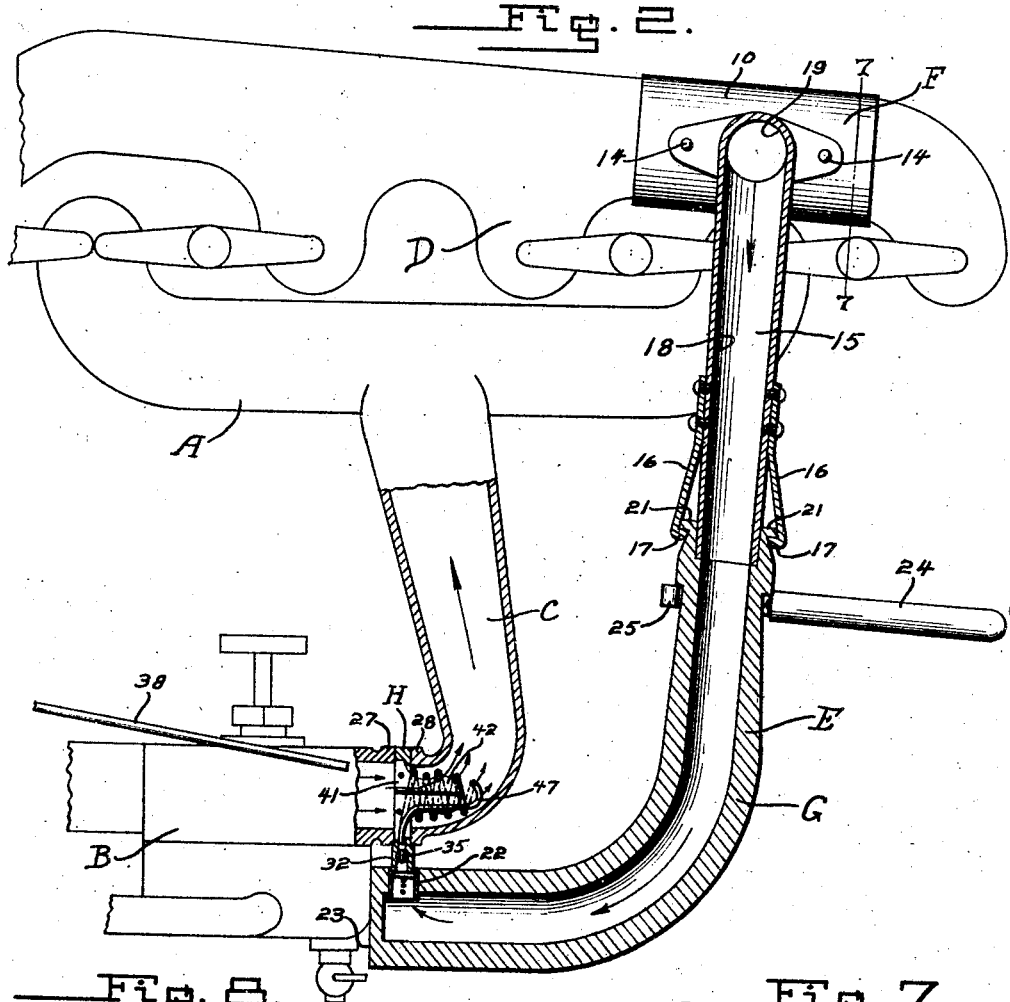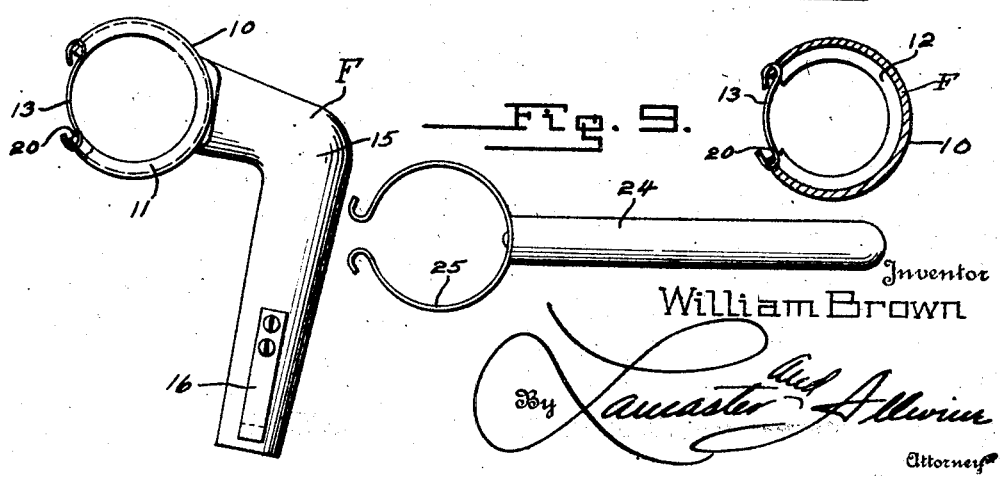

Patented Jan. 18, 1927.

1,614,543

UNITED STATES PATENT OFFICE.

WILLIAM BROWN, OF CINCINNATI, OHIO.

FUEL VAPORIZER.

Application filed July 25, 1923. Serial No. 653,794.

My present invention relates to fuel vaporizers especially adapted for use in connection with internal combustion engines.

The primary object of the invention is to provide a combined vaporizer and mixer as an aid in quickly and economically starting an internal combustion engine in cold weather.

Another object of the invention is to provide means whereby a part of the fuel vaporizer may be conveniently preheated at a point remote from the engine, where an open flame is not dangerous, and then associating the part with the engine while still hot, prior to starting of the engine.

A further object is to provide a combined vaporizer and mixer susceptible of application to various types of internal combustion engines.

Other objects and advantages of my invention will appear in the following detailed description, taken in connection with the accompanying drawings, forming a part of this specification, and in which drawings—

Figure 2 is an enlarged vertical sectional view showing more in detail the device as applied to an internal combustion engine.

Figure 7 is a sectional view taken on the line 7—7 of Figure 2.

Figure 8 is a side view of one portion of a heat conduit.

Figure 9 is a view of a handle for use when assembling the parts.

Figure 1:
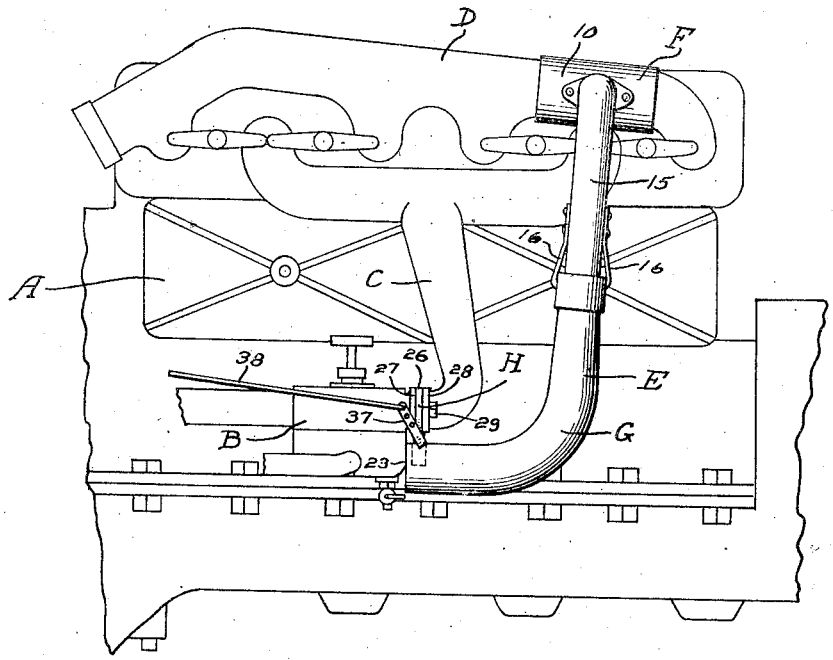
Figure 1 is a fragmentary side elevation of an internal combustion engine showing my device as applied thereto.
Figures 3, 4, 5:
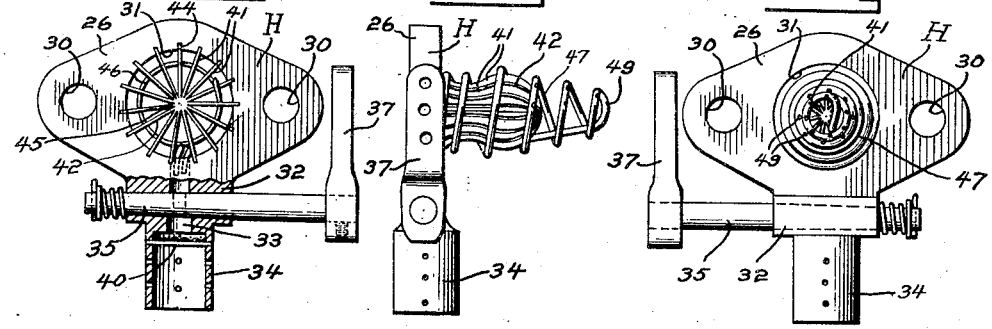
Figure 3 is an enlarged rear elevational view of the vaporizer, parts being broken away to disclose details.
Figure 4 is a side elevation of the same.
Figure 5 is an enlarged front elevational view of the vaporizer.
Figure 6:
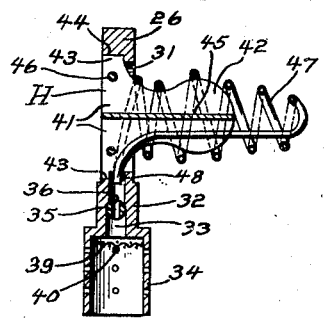
Figure 6 is a central vertical section through the same.

In the drawings, where similar reference characters designate corresponding parts throughout the views, A designates any preferred type of internal combustion engine having a carburetor B, intake manifold C and exhaust manifold D; E my improved device comprising a stove or heat collector F secured to the exhaust manifold D, G a heater detachably secured to the stove F, and H my improved vaporizer placed between the carburetor B and intake manifold C.

The stove F is preferably made of sheet metal and is securely fastened at any desirable place to the exhaust manifold D for collecting warm air to be delivered into the intake manifold C. A semi-circular portion 10 of the stove F may be closed at both ends by flanges 11 and 12, and be held in place by straps 13 which encircle the exhaust manifold D. Fastened to the portion 10 as by rivets 14 is a depending tubular L shaped member 15 provided at its lower end with diametrically disposed springs 16 having hooked lower ends 17 terminating above the lower end of the member. The passage-way 18 of the L-shaped member 15 communicates with the portion 10 as at 19. It can be seen that the air entering at 20, encircles the exhaust manifold D before passing into the passage-way 18, thereby being thoroughly heated.

The heater G, which is also of L-shape, and of tubular formation, is preferably made of cast iron for providing a good heat absorbing and radiating member, and is formed with relatively thick walls in order to retain its heat for a considerable length of time for preheating the fuel and vaporizer. This heater G, which is adapted to form a communicating passageway between the stove F and the intake manifold C, and which is adapted for ready detachment from these members for being heated in any suitable manner, is provided adjacent its upper end with diametrically disposed shoulders or lugs 21 adapted to be engaged by the spring members 16 of the stove F. A hole or opening 22 is provided in the upper wall of the heater at a point adjacent the closed lower end 23 thereof, and extends in substantially a like direction as the right angular or vertically extending portion of the heater which is adapted for attachment in longitudinal alignment with the depending portion of the stove F. It will be seen that after the heater has been sufficiently heated as by placing it in a flame or upon a stove, the same may readily be slipped upwardly into a clamped position between the stove F and vaporizer H, thereby providing a heated passageway forming communication between the stove and intake manifold. A suitable device such as illustrated in Figure 9, embodying a handle 24 having a spring clip 25 provided at one end thereof, may be employed for handling the heater G when heated to a sufficient degree.

The vaporizer H performs the dual function of mixing the air and partially vaporized fuel, and permits a quantity of warm air to enter the intake manifold for thoroughly vaporizing the fuel before entering the combustion chamber. The body portion 26 of the vaporizer H is of a size and shape to correspond with the shape of flanges 27 and 28 of the carburetor B and intake manifold C respectively and may be secured between said flanges by the usual bolts 29 passing through the aligned holes 30. An opening 31 is provided in the body portion 26 to permit the fuel to pass from the carburetor to the intake manifold. A valve housing 32 extends outwardly past the flanges 27 and 28 and is provided with a passageway 33, the outer end of which opens into a thimble 34. A tapering valve 35, having an opening 36 aligning with the passageway 33, may be operated by the arm 37 and control rod 38 for controlling the amount of air entering the manifold C. The thimble 34 is adapted to fit into the hole 22 provided in the heater G. A wire screen 39 for preventing dirt or the like from entering the manifold C is positioned within the thimble 34 and held in place by a pin 40.

A plurality of plates 41, forming a dome 42 which extends into the intake manifold C, are held in spaced relation by the ends 43 thereof fitting into recesses 44 formed in the opening 31 at the rear of the body portion 26. These plates 41 may be soldered or welded at their point of juncture 45, or may be held by a wire 46 passing through each plate.

A piece of tubing 47, having its ends securely fastened within one end of the passageway 33, as at 48, is wound spirally about the dome 42. A plurality of openings 49 are provided in the tubing 47 to permit warm air to pass into the manifold C for mixing with the fuel from the carburetor. The dome 42 and spirally wound tubing 47 extend into the intake manifold C as may be seen in Figure 2 of the drawings.

It may be observed that as the air and partially vaporized fuel from the carburetor strikes the plates 42, it will be thoroughly mixed, and by further mixing with the warm air entering through the openings 49, will be thoroughly vaporized before entering the combustion chamber.

The function of the heater G, in facilitating the starting of the engine is as follows. After the heater G has been heated to a good degree, it is placed in position by means of the handle 24, the springs 16 engaging the shoulders 21, the end wall 23 resting against the bowl of the carburetor B, and the thimble 34 of the vaporizer H extending into the hole 22. The heat from the heater G will travel through the thimble 34 and passageway 33 into the spiral tubing 47, thereby heating the dome 42 by the heat radiating from the tubing. It is also to be understood that the heat will be conducted through the metal of the thimble 34 and valve housing 32, thereby aiding in the heating of the vaporizer. The end wall 23 of the heater is adapted to lie adjacent the bowl of the carburetor B for heating the liquid contained therein. By so having the heater G of L shape in formation to conform somewhat to the shape of the intake manifold C, the heat radiating therefrom will cause the manifold to be heated, and also permit of the ready assembling of the heater into operative relation with the stove and intake manifold.

It is obvious that by so preheating these parts, a well vaporized fuel will be drawn into the combustion chamber when starting the engine.

It also follows that after the engine has run for a short while, the exhaust manifold will be heated, thereby supplying warm air to the vaporizer H.

Changes in detail may be made without departing from the spirit or scope of my invention; but,

I claim:

1. In combination with the intake and exhaust manifolds of an internal combustion engine, a vaporizer opening inwardly of the intake manifold and having a thimble extending from the manifold, a tubular heat absorbing and radiating member being closed at one end and having an opening disposed adjacent its closed end for receiving said thimble, and means for detachably supporting the heating member in operative relation to said thimble.

2. As an article of manufacture, a heater of the character described comprising a tubular L-shaped member being closed at one end, and being formed with relatively thick walls, said member having an opening disposed adjacent the closed end thereof and extending in substantially parallel relation with the right angular portion of the member.

3. In combination with an internal combustion engine including an exhaust manifold, and an intake manifold having a depending thimble opening inwardly thereof; a stove adapted for attachment to the exhaust manifold and including a depending tubular portion communicating with the stove, spring members carried by said tubular portion and having hooked shaped free ends, and a heater forming communication between the stove and intake manifold comprising an L-shaped tubular heat absorbing and radiating member being closed at its lower end and having its upper open end provided with lugs for receiving the hooked ends of said spring members, said heater having an upwardly opening aperture adjacent its closed end for slidably receiving said thimble, whereby the heater may be detachably disposed between the stove and intake manifold.

WILLIAM BROWN.